United States Patent [19]
Johnston, Jr.

[11] 4,105,042
[45] Aug. 8, 1978

[54] SOLAR HEATING METHOD AND APPARATUS

[76] Inventor: Franklin K. Johnston, Jr., 118 N. Almansor, Alhambra, Calif. 91801

[21] Appl. No.: 782,513

[22] Filed: Mar. 29, 1977

[51] Int. Cl.² ............................................. F28G 3/04
[52] U.S. Cl. .................................... 137/245; 126/271; 137/599; 165/95; 165/101
[58] Field of Search ..................... 137/244, 245, 245.5, 137/599; 126/271; 165/71, 95, 101

[56] References Cited

U.S. PATENT DOCUMENTS

| | | | |
|---|---|---|---|
| 686,860 | 11/1901 | Main ..................................... | 165/101 |
| 1,946,184 | 2/1934 | Abbot .................................. | 126/271 |
| 1,963,442 | 6/1934 | McNaughton ....................... | 165/101 |
| 2,016,587 | 10/1935 | Beckman ........................... | 165/101 X |
| 2,046,569 | 7/1936 | Madorin ............................. | 165/95 X |
| 2,163,591 | 6/1939 | Deverall ........................... | 165/101 X |

FOREIGN PATENT DOCUMENTS 707,888  4/1954  United Kingdom ...................... 165/95

*Primary Examiner*—Robert G. Nilson
*Attorney, Agent, or Firm*—Marshall A. Lerner

[57] ABSTRACT

A solar heating method and apparatus adapted to provide long term optimum efficiency in heat transfer of fluid flowing through a pipe assembly is disclosed. The pipe assembly includes a plurality of longitudinal pipe sections which may be connected either in series or parallel and each longitudinal pipe section has a removable cap or plug at one end thereof for inserting a brush mounted on the end of a rod which is rotated by a power tool for cleaning the inside of each of the sections to prevent the accumulation of excessive scale on the inside of the pipe assembly. In the parallel assembly, each pipe section communicates with a manifold, and a plug assembly is adapted to be inserted into each section to control the flow of fluid from the pipe section to the manifold to provide optimum uniform flow of fluid through each pipe section and to protect the pipe section from erosion.

9 Claims, 10 Drawing Figures

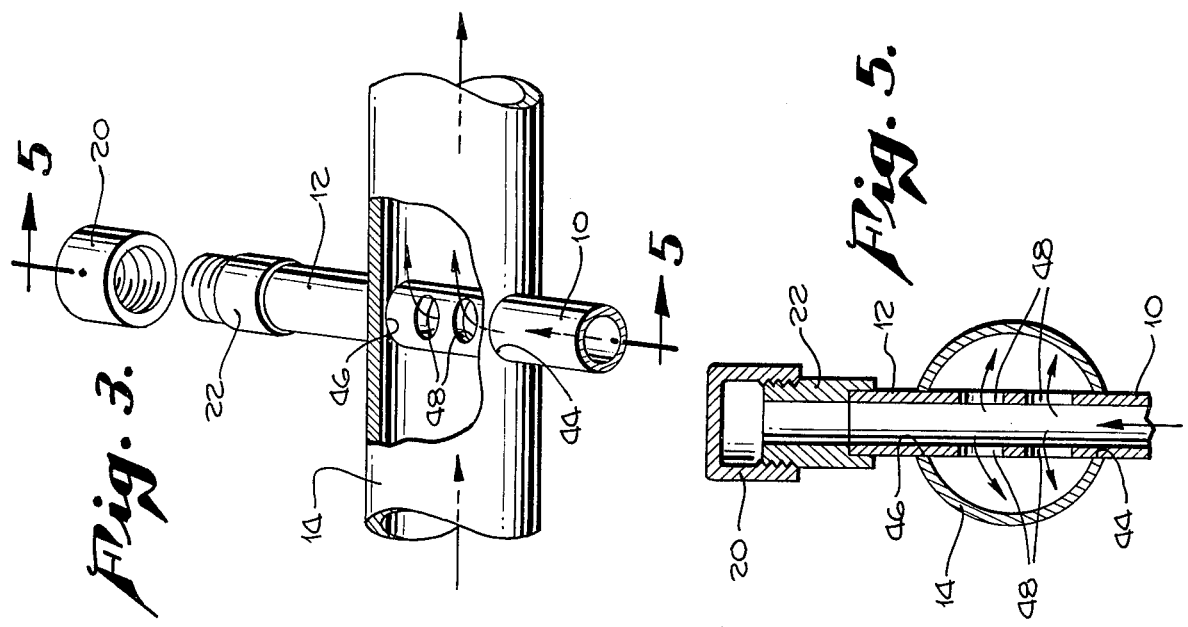
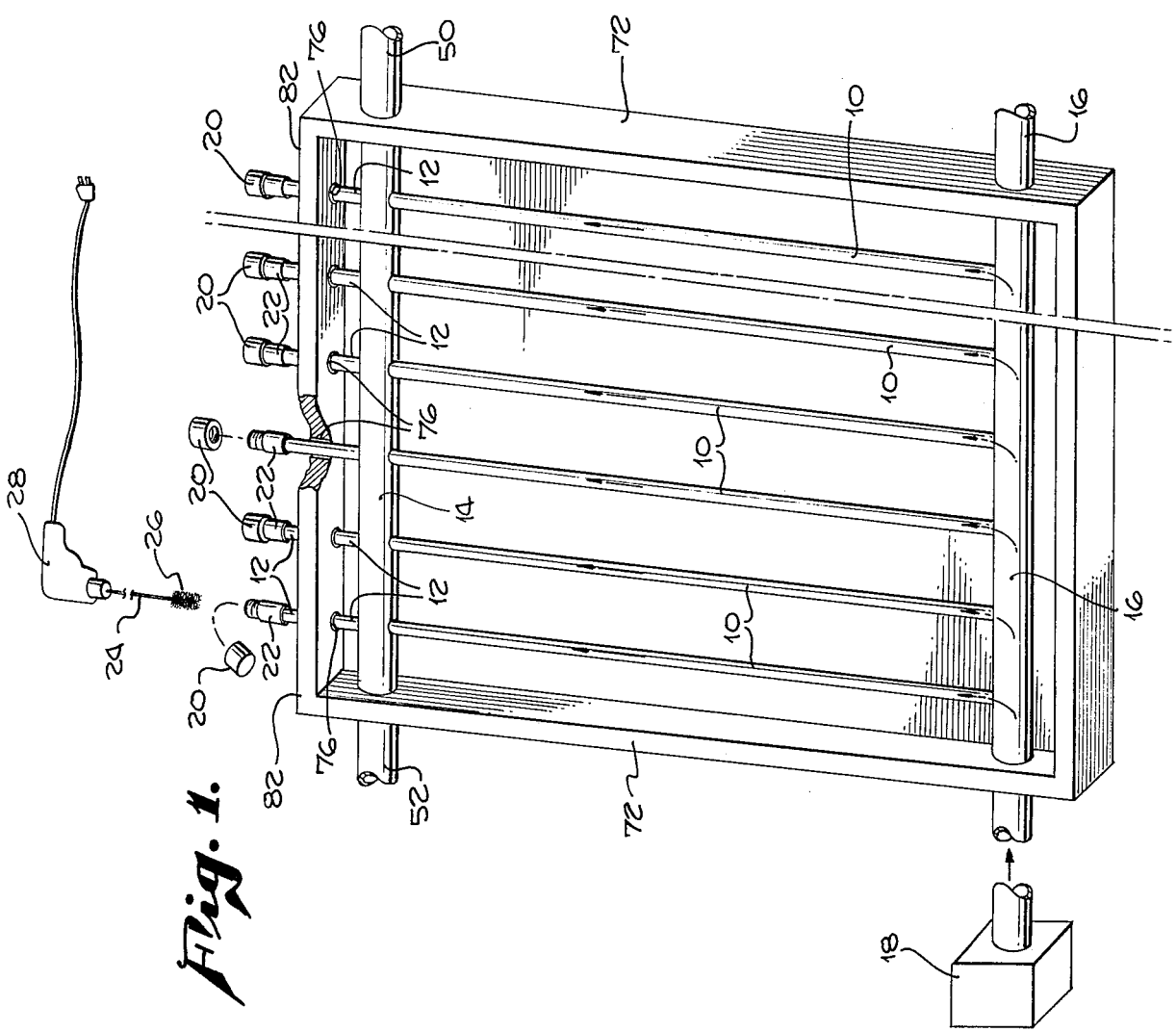

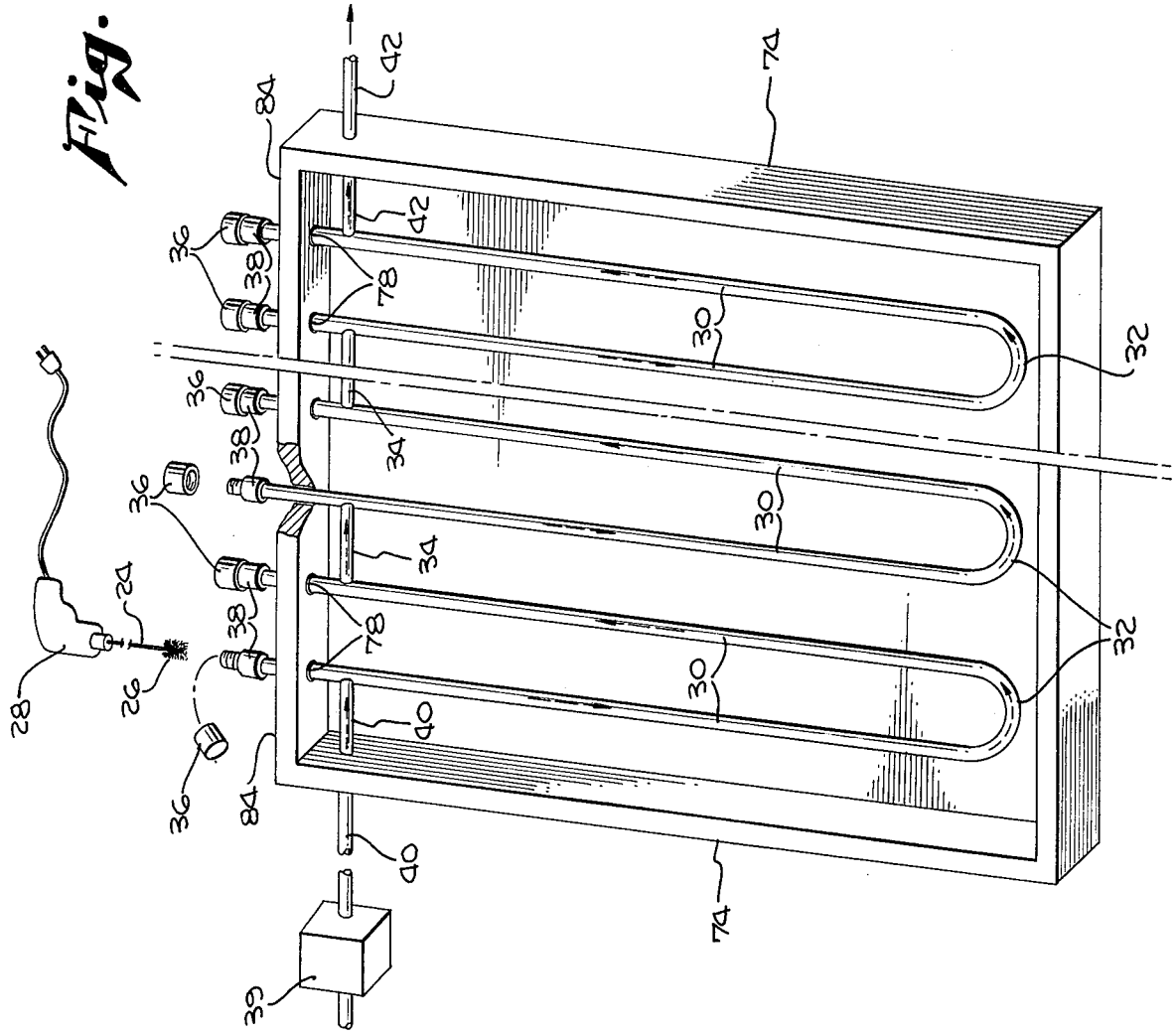

U.S. Patent Aug. 8, 1978 Sheet 3 of 3 4,105,042
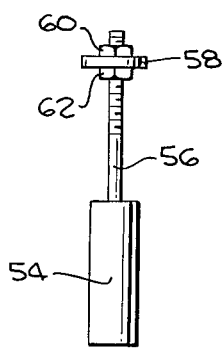
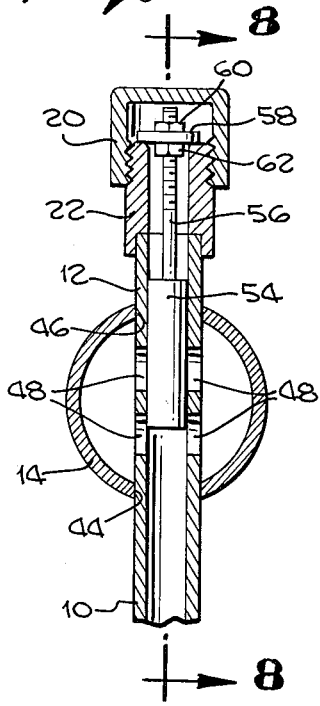
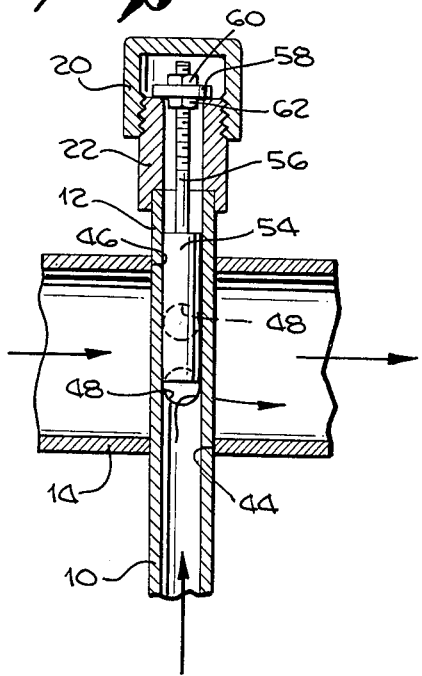
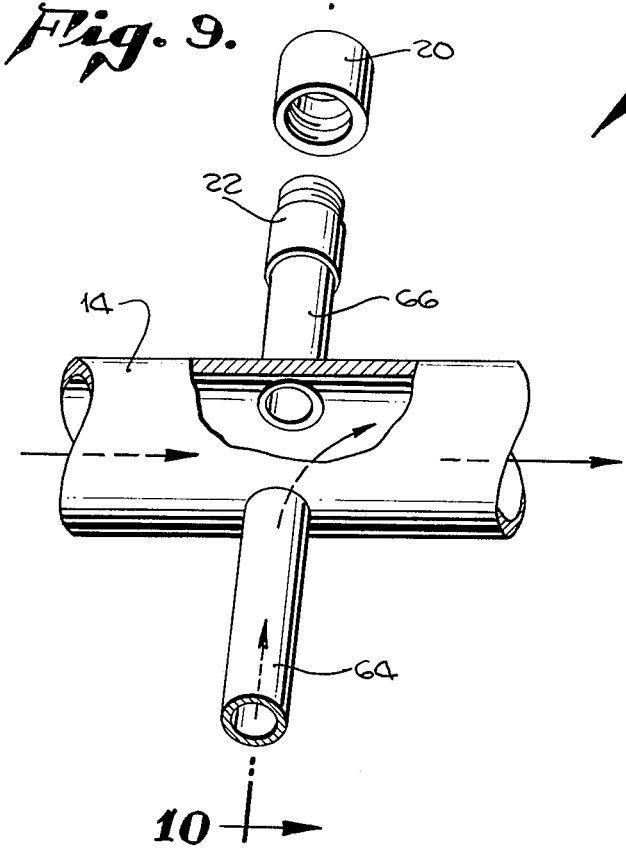
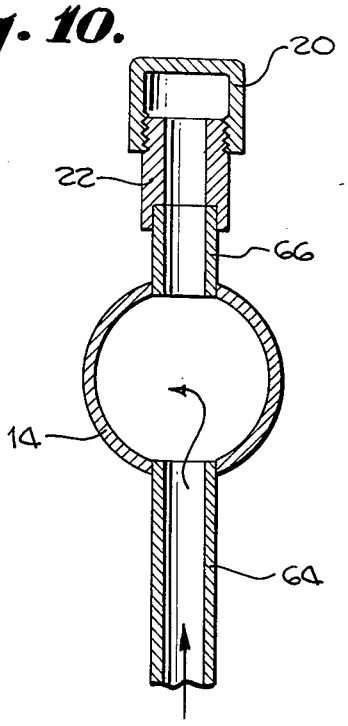

4,105,042

SOLAR HEATING METHOD AND APPARATUS

BACKGROUND OF THE INVENTION

The present invention relates to a pipe assembly for a solar heating device and more particularly to a pipe assembly adapted to provide ease of cleaning of the individual pipe sections and to control the flow of fluid through them.

Solar heating devices include an assembly of pipes through which a fluid, such as water, flows. The solar collector typically includes solar absorber panels which collect solar energy and transfers it through the pipes to the flowing water. The pipe assembly includes fluid inlet and outlet conduits and is enclosed in an insulated case with clear glazing to allow incident solar energy to pass through and be collected by the absorber panels. The pipes and absorber panels consist of metals of high conductivity to thereby provide the heat exchanging function of transfering solar energy absorbed by the panels to the water flowing through the pipes. These devices are shown in representative U.S. Pat. Nos. 966,070 to Bailey, 2,274,492 to Modine and 3,972,213 to Gallagher.

The fluid that flows through the pipes in these devices is usually hard water which causes fouling by the accumulation of scale on the inside of pipes. This scale acts as an insulator and reduces the efficiency of heat transfer from the pipes to the fluid flowing through the pipes.

The pipe assemblies for solar heaters are typically formed of an assembly of pipe sections with each section formed of a longitudinal tubular pipe which may be connected either in parallel or in series with a pumping unit connected to the assembly. The parallel assembly includes an inlet manifold which is common to all of the pipes for transmitting fluid into the pipes, and a discharge manifold also common to all the pipes, for discharging the fluid from the pipes.

In the parallel assembly, the pump unit is coupled to one end of the inlet manifold and the flowing fluid may be discharged from either end of the discharge manifold. The flow of fluid may therefore not be optimum through each tubular pipe section in the parallel assembly. Thus, less than optimum heat transfer may result in pipe sections of low flow rates. Conversely, erosion, or the gradual wearing away of the pipe material, may occur on the inside of pipe sections exposed to excessive flow rates.

SUMMARY OF THE INVENTION

The present invention is directed to a solar heating apparatus and method of cleaning the apparatus and controlling the flow of fluid there through to provide long term optimum heat transfer.

A plurality of longitudinal pipe sections is provided for conducting the fluid and each pipe section has an opening at the end. A cap or plug is secured to the end of each pipe section and removable to enable the cleaning of the pipe section. The cleaning is provided by an elongated rod having a brush at one end and mounted in the bit of a power drill at the other end. The rod is inserted into the pipe section and rotated by the power drill to clean out the scale that accumulates on the inside of each of the tubes. The periodic cleaning of the tubes thereby provides optimum heat transfer of the apparatus during its entire useful life.

In the embodiment in which the tubes are in a parallel array, each of the pipe sections includes a first portion connected to a common discharge manifold for conducting the flowing fluid. Each of the pipe sections includes a second extended portion coupled to the discharge manifold and extending to the end of the pipe section and having the cap removably secured to it.

The first and second portions of the longitudinal pipe section in the parallel assembly may be formed of a unitary pipe with one or more orifices in it for communicating with the discharge manifold. The flow of fluid through the orifices may be controlled by inserting a plug assembly in the second extended portion of the pipe section to cover a part of the orifices. Flow may be controlled as such through each pipe section of the parallel array to thereby provide optimum uniform flow throughout all the pipes of the parallel array. Low flow rates in these pipe sections offering greater resistance to the fluid flow, could be increased with corresponding desirable increases in heat transfer. Excessive flow rates, in those pipe sections offering least resistance to the fluid flow, could be reduced, thereby reducing the potential for the development of erosion normally associated with such excessive flow rates.

The first and second portions of the longitudinal pipe sections in the parallel assembly may, alternatively, be formed of two separate pieces of pipe. In this embodiment, the longitudinal pipe sections do not obstruct the flow of fluid through the discharge manifold in any manner while still providing the case of cleaning each longitudinal pipe section by removing the cap and inserting the elongated rod having the brush at the end of it and rotating the rod.

Although the plug assembly is particularly adapted to the parallel arrangement of the pipe assemblies wherein each longitudinal pipe section is integral and has orifices for communicating with the discharge manifold, it may also be used in the embodiment in which the two portions of each longitudinal pipe section is formed of two separate pieces of pipe.

BRIEF DESCRIPTION OF THE DRAWINGS

FIG. 1 is an embodiment of the present invention having a parallel pipe construction;

FIG. 2 is an embodiment of the present invention with the pipes connected in series;

FIG. 3 is a detailed view of the connection of a longitudinal pipe section with the discharge manifold, with portions broken away;

FIG. 4 is a detailed view of an alternate embodiment of the orifices in the pipe section communicating with the discharge manifold with portions broken away;

FIG. 5 is a cross-sectional view of FIG. 3 taken along the plane 5—5;

FIG. 6 is a detailed view of the plug assembly of the present invention;

FIG. 7 is a view of the connection of a longitudinal pipe section with the discharge manifold having a plug assembly mounted therein;

FIG. 8 is a cross-sectional view of FIG. 7 taken along the plane 8—8;

FIG. 9 is a detailed view of an alternate embodiment of the connection of a longitudinal pipe section with the discharge manifold with portions broken away; and FIG. 10 is a cross-sectional view of FIG. 9 taken along the plane 10—10.

DESCRIPTION OF THE PREFERRED EMBODIMENT

The present invention provides a method and apparatus for optimum heat transfer in a solar heating system. A plurality of longitudinal pipe sections each has a removable cap at the end for inserting a brush mounted at the end of an elongated rod to clean the scale which has accumulated on the inside of the pipe sections. Plug means is provided for maintaining optimum uniform flow of fluid through the longitudinal pipe sections. This method of cleaning the pipe sections of the present invention as well as the method of providing controlled uniform flow of fluid through the longitudinal pipe sections thereby provide long term optimum heat transfer and increased useful life of the system.

The longitudinal pipe sections are shown in FIG. 1 having a first portion 10 through which the fluid flows and a second portion 12 extending from a discharge manifold 14. The fluid, which is typically domestic tap water is pumped into an inlet meanifold 16 by a suitable pump 18.

Each extended portion 12 has a means at the end thereof and adapted to secure a suitable cap or plug 20 to it by use of an adaptor 22, shown in FIG. 3, which may, alternatively, be a suitable bushing, union, coupling, quick disconnect or other functional device.

The preferred embodiment would be to have the pipe assembly enclosed in an insulated case 72 as shown in FIG. 1. The extended pipe sections 12 pass through holes 76 in the wall 82 of the case to the exterior of the case, thereby providing easy access to the interior of the longitudinal pipe sections from the outside of the insulated case. Alternatively, the pipe assembly need not be enclosed in an insulated case, and thereby may be directly exposed to natural or controlled surroundings.

The pipe assembly shown in FIG. 1 is shown connected in parallel and the longitudinal pipe sections may be cleaned by simply removing each cap 20 from the associated extended second portion and inserting an elongated longitudinal rod 24 having a brush 26 at the end of it. The brush 26 may be any suitable stiff bristled brush such as a steel wire brush or, alternatively, may be a scraper embodiment with scraper surfaces to remove scale. The rod 24 is connected at the opposite end to a driving source such as a power tool 28 and the rod 24 is inserted into the longitudinal pipe section and rotated by the power tool 28 to ream out the scale accumulated on the inner surface of the pipe section.

The longitudinal pipe sections are shown connected in series in FIG. 2 with each longitudinal pipe section 30 connected to one adjacent longitudinal pipe section by a curved coupling 32 and to the opposite adjacent pipe section by a straight coupling 34 welded through a hole in the pipe section to form a simple "T" fitting. Each longitudinal pipe section 30 includes a cap or plug 36 secured to the end thereof. The caps 36 are similar to the caps shown in FIG. 1 and are secured to a suitable bushing, union, or adaptor 38 which is affixed to the end of the associated longitudinal pipe section 30.

A pump 39 pumps fluid through an inlet conduit 40. The fluid is transmitted in series through each longitudinal pipe section and discharged through an outlet conduit 42.

The preferred embodiment would be to have the pipe assembly enclosed in an insulated case 74 as shown in FIG. 2. The longitudinal pipe sections 30 pass through holes 78 in the wall 84 of the case to the exterior of the case, thereby providing easy access to the interior of the longitudinal pipe sections from the outside of the insulated case. Alternatively, the pipe assembly need not be enclosed in an insulated case, but instead, may be directly exposed to natural or controlled surroundings.

The series configuration shown in FIG. 2 may be cleaned in accordance with the method employed in cleaning the parallel configuration shown in FIG. 1. Each cap 36 is removed from the end of the associated longitudinal pipe section and the elongated rod 24, having the brush 26 at the end of it, is inserted into the longitudinal pipe section. The power tool 28 is energized to rotate the rod 24 to cause the brush 26 to ream out the scale which has accumulated on the inside of each of the pipe sections 30.

FIG. 3 shows an embodiment of the connection of the longitudinal pipe section of the parallel pipe assembly with the two portions of pipe section being formed of a unitary elongated pipe. The manifold 14 has a plurality of pairs of holes 44 and 46 with each longitudinal section fitted through one of the pipes of the holes and welded to the manifold. The unitary construction of the pipe section provides rigidity to it and prevents bending of the second extended portion 12.

Orifices 48 are machined out of the portion of the pipe section which communicates with the inside of the manifold 14 for allowing fluid to flow from the first portion 10 into the discharge manifold 14. The size and number of the orifices 48 is such that the total flow area of the orifices for any one longitudinal pipe section is greater than the cross-sectional area of the inside of the longitudinal pipe section.

The orifices 48 are positioned in the discharge manifold 14 diametrically opposite each other and facing in a direction perpendicular to the direction of normal flow of fluid in the manifold 14, as shown in FIGS. 3 and 5. The positioning of the orifices in this manner allows multidirectional flow in manifold 14 and also eliminates direct head-on collision of the flow from the longitudinal pipe section with the flow in the discharge manifold. As would occur if the orifices were positioned in the discharge manifold 14 diametrically opposite each other facing a direction parallel to the direction of normal flow of fluid in the manifold 14, such collision would result in adverse turbulence and would cause more energy to be required to motivate the fluid through the system. The positioning of the orifices to discharge fluid in a direction perpendicular to the normal flow of fluid in the manifold 14 avoids backflow pressure through the first portion 10 of the associated longitudinal section which, in turn, reduces the energy required to pump fluid through the system. Although, in the preferred embodiment, the orifices 48 are shown in pairs on opposite sides of the longitudinal pipe sections, it is only necessary to have one orifice for discharging fluid into the discharge manifold. Further, although the preferred embodiment provides for orifices 48 to be diametrically opposite each other and facing in a direction perpendicular to the direction of normal flow of fluid in the manifold 14, it is alternatively possible, as shown in FIG. 4, to position one or more orifices 49 in each of the unitary pipes such that the orifice or orifices are only on the downstream side of the unitary pipe section with respect to the direction of normal flow of fluid in manifold 14. This latter embodiment would limit flow in the manifold 14 to one direction only.

The discharge manifold 14 may discharge the heated fluid either through a port 50 shown in FIG. 1 on the right hand end of the manifold or through a port 52 at the left hand end of the discharge manifold, or through both right and left hand ports. If the pump 18 transmits fluid into the left hand end of inlet manifold 16 and any fluid is transmitted out the left hand end of discharge manifold 14 through port 52, the rate of flow of fluid of the longitudinal pipes sections on the left hand side of the assembly may be greater than that through the right hand side of the assembly. The imbalance or flow rates contributes to less than optimum heat transfer in pipe sections experiencing low flow rates and as well contributes to the development of erosion problems of the pipe material in those pipe sections experiencing higher than recommended flow rates. In order to avoid non-uniform flow rates of fluid through the various longitudinal pipe sections of the pipe assembly, plug means is provided to be adapted to be fitted through the second extended portions 12 of the pipe sections to control the flow of fluid through the orifices 48. The plug means is shown in detail in FIG. 6 and includes a stationary piston 54, which is attached to a threaded shaft 56. A retainer ring 58 is secured to the shaft and held at the desired position by lock nuts 60 and 62. The distance between the retainer ring 58 and the piston 54 may be simply adjusted by rotating the lock nuts 60 and 62.

The plug assembly is used to control the flow of fluid through the orifices 48 by simply removing the cap 20 and inserting the plug in the second extended portion 12 of the associated longitudinal pipe section against the shoulder of the adaptor 22 as shown in FIGS. 7 and 8. The cap 20 is then replaced onto the end of the extended pipe section. The piston 54 thereby impedes the flow of fluid through part or at least one of the orifices 48 to thereby adjust the flow of fluid through the first portion 10 of the associated longitudinal pipe section.

When the entire system is initially installed, the adjustment of each retainer ring 58 is performed by rotating the lock nuts 60 and 62. Before the plug assembly is inserted in the associated longitudinal pipe section, the end of the shaft 56 may be cut to length to fit, with minimal clearances, into the end of the pipe section. This adjustment for each longitudinal pipe section of the entire system usually is done on a one time only basis when the system is installed. The plug assembly may however be removed subsequent to the initial installation to provide any desired adjustment. In either case, such adjustment optimizes heat transfer by increasing fluid flow through pipe sections that would otherwise, without use of the plug assembly, accomodate low fluid flow rates. Also such adjustment may lengthen the life of such an assembly be decreasing fluid flow through pipe sections that would otherwise, without use of the plug assembly, accomodate excessive flow rates with resultant erosion deteriorating the insides of the pipe sections.

The two portions of the longitudinal pipe section through the manifold 14 may be formed of two separate pipe portions as shown in FIG. 9. The first portion 64 is welded through one of the pairs of holes of the manifold 14 for communicating heated fluid with the manifold 14. The second portion 66 is welded through the second hole in the pair of holes and extends outwardly to the end of the longitudinal pipe section and has the cap 20 fitted through a bushing, adaptor, union, or other suitable fixture 22 at the end thereof.

As shown in FIG. 10, in the embodiment of the invention, the construction of the longitudinal pipe section in two separate portions avoids any obstruction in the manifold 14. This permits fluid to flow through the manifold easily while still providing the important feature of enabling the inside of each longitudinal pipe section to be cleaned by simply removing the plug 20 and inserting the elongated rod 24 having the brush 26 at the end.

Although the plug assembly shown in FIG. 6 is particularly adapted to control the flow of fluid through orifices 48 in the embodiment shown in FIGS. 3, 4, 5, 7 and 8, the plug assembly may also be used in controlling the flow of fluid through the embodiments shown in FIGS. 9 and 10.

The pipe sections may be formed of any suitable material such as copper. The portion of each pipe section, shown in FIG. 3, which is between the two holes in the manifold 14 may be integral with the two extended portions and formed of copper. Alternatively, this portion which is between the two holes may be formed of a suitable erosion resistant material such as certain hard alloys of steel. This erosion resistant material is particularly significant in preventing erosion of the pipe material which may otherwise result from the constant discharge of fluid through the orifices 48.

Many modifications and variations of the present invention are possible in light of the above teachings. For example, the second extended portion 12 shown in FIG. 1 need not necessarily extend from the discharge manifold, but may be fitted to extend from the inlet manifold 16 provided the associated second extended portions have a coincidental center line with the associated first portions of the longitudinal pipe sections. In such an embodiment, the rod 24 would simply be inserted through the extended portions extending outwardly from the inlet manifold 16 to clean out each of the individual pipes. It is therefore to be understood that the present invention can be practiced otherwise than as specifically described.

I claim:

1. A pipe assembly for a solar heater comprising:
   a plurality of longitudinal pipe sections for conducting a fluid, with each of said pipe sections having an opening at the end thereof;
   plug means adapted to be fitted through the end of each of said plurality of longitudinal pipe sections for controlling the rate of flow of fluid through the pipe assembly; and
   cap means including a plurality of caps each associated with one of said longitudinal pipe sections and secured to the end thereof and removable to enable cleaning of the inside of the associated pipe section.

2. The pipe assembly as described in claim 1 and wherein said plurality of pipe sections are arranged in a parallel array and further including:
   an inlet manifold connected to each of said longitudinal pipe sections for transmitting fluid into each of the longitudinal pipe sections, and,
   an outlet manifold connected to each of said longitudinal pipe sections for transmitting fluid out of each of said longitudinal pipe sections.

3. The pipe assembly as described in claim 1 and wherein said plurality of longitudinal pipe sections are arranged in a parallel array and further including;
   manifold means for connecting each of said plurality of longitudinal pipe sections, and each of said longitudinal pipe sections includes an extended portion coupled to said manifold means and to which said cap means is secured.

4. The pipe assembly as described in claim 1 and wherein each of said plurality of longitudinal pipe sections is connected to provide series flow of fluid.

5. A pipe assembly for a solar heater comprising:
a plurality of longitudinal pipe sections for conducting a fluid, with at least one of said pipe sections having an opening at the end thereof, with said plurality of longitudinal pipe sections arranged in a parallel array;
manifold means for connecting each said plurality of longitudinal pipe sections, said manifild means having a plurality of pairs of holes;
a plurality of extended portions each associated with one of said longitudinal pipe sections and each coupled to said manifold means, with each of said extended portions being an integral part of the associated longitudinal pipe section with each of said plurality of extended portions and the associated longitudinal pipe section being fitted through a different one of said plurality of pairs of holes; and
cap means secured to at least one of said extended portions, said cap means being removable to enable cleaning of the inside of the associated longitudinal pipe section.

6. The pipe assembly as described in claim 5 and wherein each of said integral longitudinal pipe sections has at least one orifice for communicating fluid between the associated longitudinal pipe section and said manifold means in a direction perpendicular to the direction of the normal flow of fluid in said manifold means.

7. The pipe assembly as described in claim 6 and further including plug means adapted to be fitted through said extended portions of said longitudinal pipe sections to control the flow of fluid through said orifices.

8. The pipe assembly as described in claim 7 and wherein said plug means includes:
a plurality of pistons each adapted to block a portion of at least one orifice in the associated longitudinal pipe section to control the flow of fluid therethrough,
a plurality of threaded shafts each connected to one of said pistons, and
a plurality of retainer assemblies each adapted to be threaded on one of said plurality of shafts to adjust the distance between the associated piston and the associated retainer assembly to provide adjustability of the portion of the associated orifice through which fluid flows.

9. The pipe assembly as described in claim 5 and wherein each of said integral longitudinal pipe sections has at least one orifice for communicating fluid between the associated longitudinal pipe section and said manifold means in a direction parallel to the direction of the normal flow of fluid in said manifold means; said orifice being on the downstream side of the said integral longitudinal pipe section with respect to the direction of the normal flow of fluid in said manifold means.

* * * * *